ated May 21, 1968

United States Patent Office 3,383,980
Patented May 21, 1968

3,383,980
OPTICAL APPARATUS FOR MEASURING MATERIAL DAMPING, DYNAMIC YOUNG'S MODULUS AND CREEP BY PHOTOGRAPHIC MEANS
Horst Paul Richter, 447 Ontario Drive,
Livermore, Calif. 94550
Filed Sept. 30, 1963, Ser. No. 313,722
2 Claims. (Cl. 88—14)

ABSTRACT OF THE DISCLOSURE

Dynamic deflection apparatus including a cylindrical test specimen supported at one end in a rotatable fixture and having a camera telescopically aligned along the optical path from the specimen axis to record the motion of a fiducial mark on the free end of the specimen.

---

This invention relates to the measurement of dynamic material properties such as damping (internal friction, hysteresis, absorption, attenuation), dynamic Young's modulus, and static creep. The frequencies of rotation of an axially rotating test specimen range from zero to approximately 1,000 r.p.m.

The new apparatus consists of two independent embodiments.

A reticle, scale, or any other suitable comparator is placed as an integral part into an optical system which is made up of an aligning telescope, a camera, and a bright dot at the free end of a cantilever beam. The scale which is superimposed on the exposures of the beam deflection curves serves as a comparator for direct measurement of position and size of the deflection curves.

The second new device incorporates a beam splitter into the optical system previously described in this application. The beam splitter achieves the superposition of the comparator scale on the exposures of the deflection curves in the film plane, when this scale is not positioned in the plane at the free end of the test specimen. Several pieces of the arrangement described above take different positions relative to each other in this second system.

Figure 1:
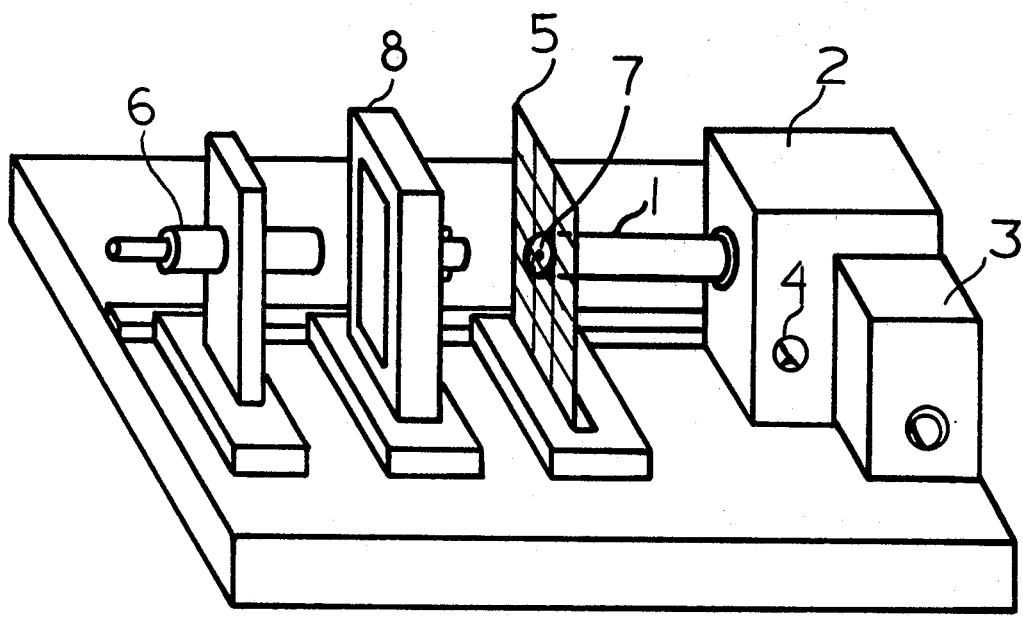
FIGURE 1 illustrates the arrangement of camera, comparator, aligning telescope, test specimen, precision spindle, and variable drive. The optical system and its functions are described in detail below.

For many applications it is desirable to extend the measurement of the dynamic Young's modulus and of the internal friciton factor to the low frequency range (1,000 r.p.m. to 0.1 r.p.m. and less). In this range electromagnetic methods and mechanical vibrations are of little value. A convenient method which could be applied to any solid material was not available.

Though the rotating cantilever beam has been used successfully by Lazen, Kimball, Lovell, and others, it remains difficult to observe visually a moving dot through a microscope or cathetometer. This method becomes useless, when the field of view of a microscope becomes too small. At low speeds of revolution it becomes particularly tedious to follow a dot placed at the free end of the rod. The invention described in this application overcomes these difficulties by photographing a scale and then superimposing several curves at different speeds of rotation and at different loads. It was possible to obtain 12 distinguishable exposures on one picture. The outlined apparatus permits the measurement of deflections as they relate to creep, the dynamic Young's modulus, and damping.

For the measurement of damping (material absorption or internal friction) the fact is used that stress and strain are out of phase under dynamic loading due to the energy absorption occurring in a realistic material. This phase angle $\delta$ appears between horizontal $D_h$ and vertical deflections $D_v$ and can be read directly from the photographs. It is related to the logarithmic decrement $\Delta$, the ratio of the imaginary $E_2$ and real part $E_1$ of a complex modulus, the quality factor Q, and the ratio of the strain energy dissipated during a single cycle $\Delta W$ and the total vibrational energy W by the relation $$\frac{1}{2\pi}\frac{\Delta W}{W}=\frac{E_2}{E_1}=\frac{D_H}{D_V}=\tan\delta=\frac{\Delta}{\pi}=Q^{-1}$$

It has been demonstrated that sufficient accuracy can be achieved for high strength materials by using an initial lens magnification before exposure.

The below described devices permit the measurement of dynamic material constants of small and relative large test rods and tubes. Test specimens of 3 feet length have been used.

Any type of solid material such as metal, laser crystals, resin reinforced plastics, and polymers can be used. Time dependent effects, as they occur in fatigue tests, can be measured.

Large dynamic deflections can be recorded, when the field of view of a microscope would be too small or mechanically contacting indicators would alter testing conditions by their own inertia.

Since the scale experiences the same distortions as the deflection curves by the lens system of the camera, they eliminate themselves and corrections need not be made as in other possible optical systems.

By using an initial lens magnification before exposure, deflections of a few ten thousandth of an inch can be measured with adequate accuracy. Thus, limitations of photographic film resolution can be overcome.

By introducing a beamsplitter into the optical system, It becomes possible to take measurements in a temperature bath or vacuum without placing the comparator into physical contact with the end face of the test specimen.

The arrangement of the test apparatus is illustrated in FIGURE 1. A test specimen 1, such as a rod or tube, is inserted and fixed into a precision spindle 2. A speed drive allows to change the revolutions per minute which are measured by a tachometer 4.

This invention consists in placing a scale 5 near the free end of the loaded or unloaded cantilever beam specimen. This scale preferably consists of a commercially prepared comparator of sufficient precision having a square grid (division). A polar coordinate system also can serve as a reference system. Scales or reticles are commercially available or can be made to specifications.

Furthermore a suitable telescope 6 is used for aligning a reference point or zero point of the comparator scale with the center of the spindle axis, when the clockwise and counterclockwise rotations of the unloaded beam cannot be used for establishing a reference point.

A bright dot 7 is placed at the center of the end face of the cantilever beam. The dynamic and static deflections of the loaded and unloaded cantilever beam are then indicated by the white dot representing the neutral fiber.

The next step of the innovation consists in using a camera 8 and photographing the illuminated scale and superimposing exposures of the deflection curves described by the white dot at the end of the specimen. The obtained photographs are evaluated by a shadowgraph or microscope for obtaining the horizontal and vertical deflections.

The bright dot at the end of the specimen can be a paint dot, a polished metal tip, or in case of a tube a small illuminated aperture.

If distances between the end of the cantilever beam, comparator, camera lens, and film plane are measured with sufficient accuracy, the comparator need not be placed near the end of the specimen. However, then corrections for the relative size have to be used for evaluation of photographs and separate focussing for the scale becomes necessary.

When the length of the specimen is to be changed during a test or when the specimen is in a temperature bath, it is desirable not to bring the comparator in physical contact with the test specimen.

Figure 2:
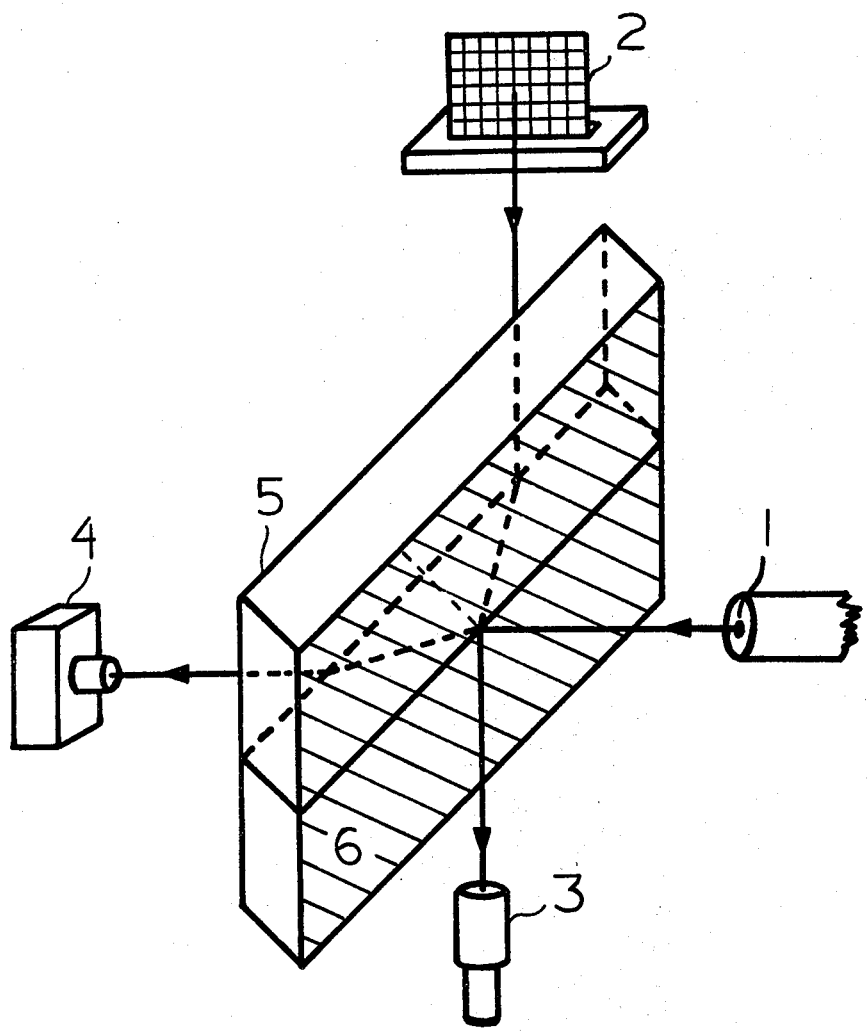
FIGURE 2 illustrates the relative positions of the parts belonging to the optical system of FIGURE 1, when a beam splitter is used in addition.

This is achieved by introducing a beamsplitter into the optical system described above and by rearranging the different parts as shown in FIGURE 2.

The light rays coming from the bright mark 1 at the free end of the test specimen pass through the beamsplitter 5 into the camera 4. The light rays from the illuminated scale 2 of the comparator are reflected by the half-silvered mirror surface 6 of the beamsplitter 5 into the camera 4 and are superimposed on those from the mark 1. The superposition occurs on the screen of the camera 4. The aligning telescope 3 receives the transmitted rays from the scale 2 and the reflected ones from the mark 1. It is used for having the light rays from the mark 1 and the scale 2 meet at the same point of the half silvered mirror surface 6. The aligning telescope also serves for aligning the scale with the spindle axis for establishing an absolute reference point.

I claim:

1. Apparatus for recording material dynamic deflections comprising an elongated test specimen having first and second ends, means for rotating said specimen about its lengthwise axis at varying rates of rotation, said means including a spindle to support said specimen at the first end thereof, a mark for visibly indicating the rotational position of said axis of said specimen, said mark located at the center of the second end of said specimen, a transparent comparator having a scale thereon, said comparator disposed to intercept the image of said mark, the plane of said comparator being parallel to the plane of the image of said mark, a camera and an aligning telescope, said camera and telescope disposed to intercept the image of said comparator and said mark.

2. The apparatus of claim 1, further distinguished by a beamsplitter, the optical axis of said telescope and comparator forming a first straight line with an intersection at right angles to a second straight line formed by said camera and the axis of rotation, the plane of said beamsplitter aligned at an angle of 45 degrees to said lines at the intersection thereof and the plane of the beamsplitting surface thereof, including the line which is mutually perpendicular to said first and second straight lines at this common intersection.

References Cited

UNITED STATES PATENTS

| | | | |
|---|---|---|---|
| 1,416,550 | 5/1922 | Frank | 73—70.2 |
| 2,591,444 | 4/1952 | Lazan | 73—100 X |
| 2,775,158 | 12/1956 | Mitchell | 88—14 X |

FOREIGN PATENTS 682,380   10/1939   Germany.

OTHER REFERENCES

Lazan, B. J.: A Study With New Equipment of the Effect of Fatigue Stress on Damping Capacity and Elasticity of Mild Steel, Transactions of American Society for Metals, vol. 42, 1952, pp. 499–558.

JEWELL H. PEDERSEN, *Primary Examiner.*

A. A. KASHINSKI, *Assistant Examiner.*